United States Patent
Abedin et al.

(10) Patent No.: US 11,595,873 B2
(45) Date of Patent: Feb. 28, 2023

(54) PRIORITIZING RADIO FREQUENCY (RF) BAND CONNECTION IN MARGINAL COVERAGE AREAS BASED ON HOUSING POSITION OF A COMMUNICATION DEVICE

(71) Applicant: MOTOROLA MOBILITY LLC, Chicago, IL (US)

(72) Inventors: Md Faisal Abedin, Lisle, IL (US); Si Chen, Chicago, IL (US); Mohammed R. Abdul-Gaffoor, Palatine, IL (US); Daniel C. Chisu, Franklin Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 159 days.

(21) Appl. No.: 16/953,979

(22) Filed: Nov. 20, 2020

(65) Prior Publication Data

US 2022/0167242 A1     May 26, 2022

(51) Int. Cl.
    *H04W 88/06*     (2009.01)
    *H04W 36/32*     (2009.01)
    *H04W 36/00*     (2009.01)

(52) U.S. Cl.
    CPC ..... *H04W 36/32* (2013.01); *H04W 36/00835* (2018.08)

(58) Field of Classification Search
    CPC ........... H04W 24/02; H04W 36/00835; H04W 36/32; H04W 48/16; H04W 88/06
    See application file for complete search history.

(56) References Cited

U.S. PATENT DOCUMENTS

| | | | |
|---|---|---|---|
| 5,903,840 A | * | 5/1999 | Bertacchi .......... H04W 36/0088 370/332 |
| 2013/0343223 A1 | * | 12/2013 | Martin .................. H04W 48/16 370/252 |
| 2020/0119760 A1 | | 4/2020 | Mizunuma et al. |

FOREIGN PATENT DOCUMENTS

| EP | 2622681 B1 | 7/2018 |
|---|---|---|
| WO | 2020034327 A1 | 2/2020 |
| WO | 20200187066 A1 | 9/2020 |

OTHER PUBLICATIONS

International Searching Authority (EPO), International Application No. PCT/US2021/057471, International Search Report and Written Opinion, dated May 4, 2022.

* cited by examiner

*Primary Examiner* — Lester G Kincaid
*Assistant Examiner* — Dung L Lam
(74) *Attorney, Agent, or Firm* — Isidore PLLC (57) ABSTRACT

A communication device, method, and computer program product mitigate antenna performance degradation that can result from folding or closing the communication device. A controller of the communication device identifies that the communication device is in a marginal coverage area for receiving a downlink in a first radio frequency (RF) band. The controller determines that first and second housings of the communication device are positioned in a first position that has degraded antenna performance for the downlink whereas a second position is not degraded. In response to the housings being in the first position while the communication device is in the marginal coverage area, the controller prioritizes connection to one or more nodes to communicate with the communication device via a second RF band.

20 Claims, 8 Drawing Sheets

PRIORITIZING RADIO FREQUENCY (RF) BAND CONNECTION IN MARGINAL COVERAGE AREAS BASED ON HOUSING POSITION OF A COMMUNICATION DEVICE

TECHNICAL FIELD

The present disclosure relates generally to communication devices that scan and acquire over-the-air (OTA) network services, and more particularly to communication devices that prioritize OTA network services.

DESCRIPTION OF THE RELATED ART

Communication devices, such as smartphones, incorporate a number of antennas to support multiple frequency bands assigned to various types of communication networks. Lower radio frequency (RF) bands continue to be supported by antennas incorporated into the communication device. Particular public land mobile network (PLMN) and radio access technology (RAT) combinations as well as services based on 802.11 wireless and global positioning system (GPS) signals can use lower RF bands. Higher RF bands use smaller but more directional antennas. Recent designs of communication devices incorporate an increased number of antennas and antenna arrays for spatial diversity and directional antenna gain via multiple-in multiple output (MIMO) operations.

Generally-known communication devices having a flip form factor can have degraded antenna performance in certain RF bands in marginal coverage areas when the communication device is folded or closed. During folding or closing, components in one movable portion of the communication device are brought close to components in the other portion of the communication device, changing antenna performance for certain antennas or antenna arrays. Conventionally, the communication device having a flip form factor maintains and uses a single RF-band scan list to select an appropriate network system for cellular service, in the same manner as communication devices having a "candy bar" form factor that do not fold or close. As a result, the communication device in the folded state can experience degraded quality of service (QoS) and increased power consumption in selecting a non-optimum RF band and antenna combination when in the folded or closed state.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, computer program product, and method mitigate antenna performance degradation that can result from folding or closing the communication device. The communication device includes a first housing and at least one second housing that is movable relative to the first housing between a first position and a second position. A housing sensor detects a current position of the at least one second housing relative to the first housing. A communication subsystem of the communication device includes one or more receivers that support over-the-air (OTA) downlink communication in a first radio frequency (RF) band and at least one second RF band from one or more nodes. An antenna subsystem of the communication subsystem has more than one antenna component, including first and second antenna components. The first antenna component is attached to the first housing. The second antenna component is attached to the at least one second housing. The communication subsystem has a degraded reception performance in the first RF band while the at least one second housing is in the first position. The communication device includes a memory containing a band-scan priority list that is based at least in part on the relative position of the first and the at least one second housing. The communication device includes a controller that is communicatively coupled to the housing sensor, the communication subsystem, and the memory. The controller determines that the communication device is in a marginal coverage area for receiving the first RF band from the one or more nodes. The controller determines, based on the housing sensor, that the at least one second housing is in the first position. In response to the at least one second housing being in the first position while the communication device is in the marginal coverage area for receiving the first RF band, the controller prioritizes connection to the one or more nodes to communicate with the communication device via a second RF band from among the at least one second RF band.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
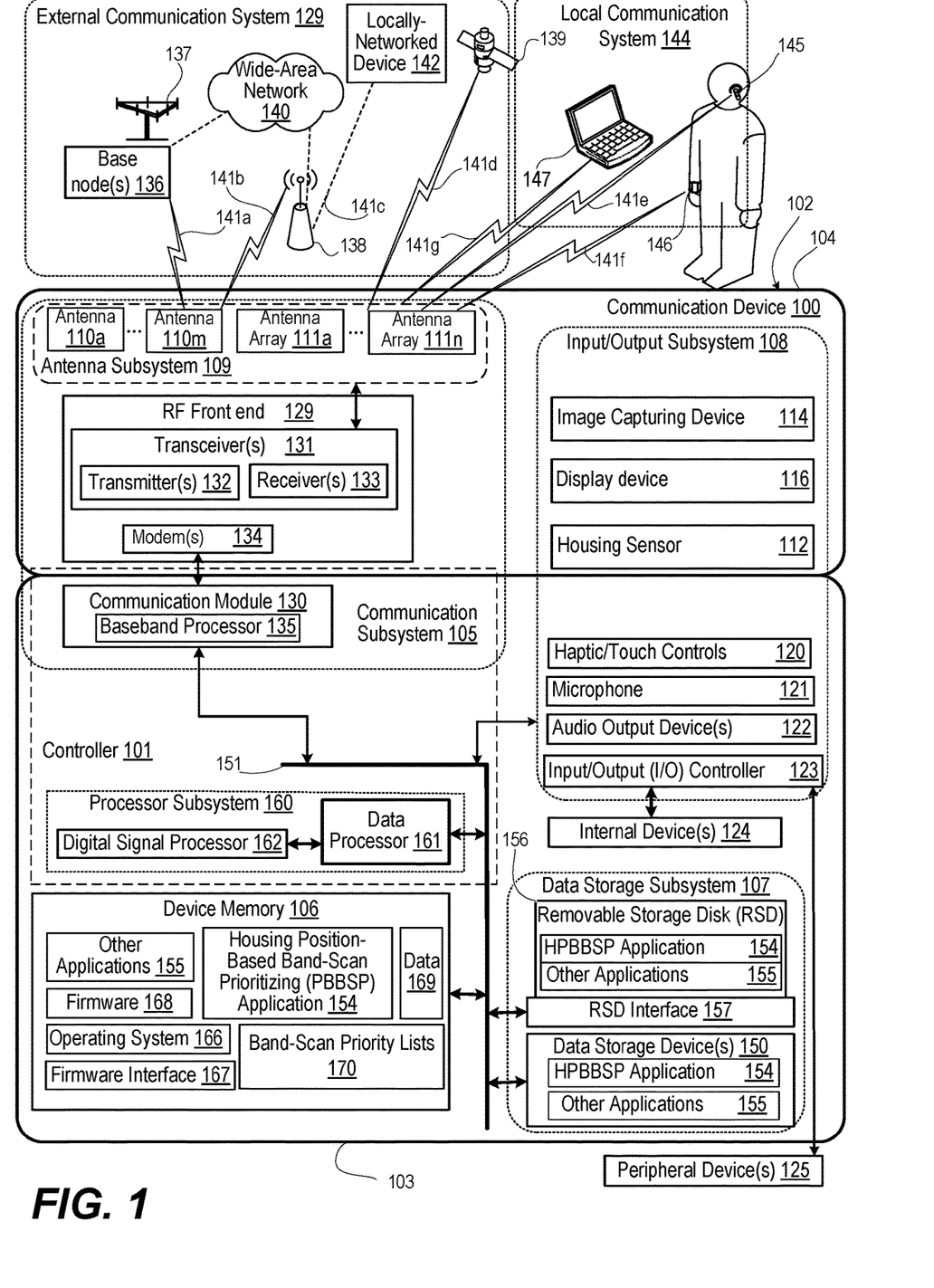
FIG. 1 depicts a functional block diagram of a communication device with a flip form factor operating in a communication environment and within which the features of the present disclosure are advantageously implemented, according to one or more embodiments.

FIG. 1 is a functional block diagram of communication device 100, which is managed by controller 101, in an operating environment within which the features of the present disclosure are advantageously implemented. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes communication subsystem 105, device memory 106, data storage subsystem 107, and input/output (I/O) subsystem 108. Device memory 106 and each subsystem (105, 107, and 108) are managed by controller 101. According to one aspect, communication device 100 is a fixed, portable, mobile, or hand-held device having housing assembly 102. Housing assembly 102 includes at a first housing 103 and a second housing 104 that are relatively positioned in a first and a second position. One or more intervening positions can exist between the first and second positions. Communication subsystem 105 includes antenna subsystem 109 having lower band antennas 110*a*-110*m* and higher band antenna arrays 111*a*-111*n* that are attached in different portions of housing assembly 102. The relative position of first and second housings 103-104 can affect communication subsystem 105. Communication device 100 has degraded antenna downlink performance in a first RF band when housing assembly 102 is in the first position. For example, the first position can be a folded or closed position of housing assembly 102.

Controller 101 configures communication subsystem 105 to mitigate effects of the degraded antenna performance based on detecting the position of housing assembly 102 via housing proximity sensor 112 of I/O subsystem 108. In one or more embodiments, housing proximity sensor 112 detects proximity of first housing 103 to second housing 104. In one or more embodiments, housing proximity sensor 112 has a mechanical extension that is depressed when the first and second housings 103-104 move in one of open and closed positions. The depression changes a switch position, indicating the open/closed position of the housing. In one or more embodiments, housing proximity sensor 112 includes an electromagnetic field producing component in one of the first and second housings 103-104 and a target positioned in the other one of the first and second housing. The target has an electromagnetic capacitance or impedance that is detected by the electromagnetic field producing component with a change in strength based on the open/close position of housing assembly 102.

I/O subsystem 108 includes image capturing device(s) 114 and user interface devices such as display device(s) 116, touch/haptic controls 120, microphone 121, and audio output device(s) 122. I/O subsystem 108 also includes I/O controller 123. I/O controller 123 connects to internal devices 124 that are internal to housing assembly 102 and to peripheral devices 125, such as external speakers that are external to housing assembly 102 of communication device 100. Examples of internal devices 124 are computing, storage, communication, or sensing components depicted within housing assembly 102. I/O controller 123 supports the necessary configuration of connectors, electrical power, communication protocols, and data buffering to interface internal devices 124 and peripheral devices 125 to other components of communication device 100 that use a different configuration for inputs and outputs.

Communication subsystem 105 includes radio frequency (RF) front end 129 and communication module 130. RF front end 129 has transceiver(s) 131, which includes transmitter(s) 132 and receiver(s) 133. RF front end 129 further includes modem(s) 134. Communication module 130 of communication subsystem 105 has baseband processor 135. Baseband processor 135 communicates with controller 101 and RF front end 129. Baseband processor 135 operates in baseband frequency range to encode data for transmission and decode received data, according to a communication protocol. Modem(s) 134 modulate baseband encoded data from communication module 130 onto a carrier signal to provide a transmit signal that is amplified by transmitter(s) 132. Modem(s) 134 demodulates each signal received from external communication system 129 and/or detected by antenna subsystem 109. The received signal is amplified and filtered by receiver(s) 133, which demodulate received encoded data from a received carrier signal.

In one or more embodiments, controller 101, via communication subsystem 105, performs multiple types of over-the-air (OTA) or wireless communication with external communication system 129. External communication system 129 can include devices such as base node(s) 136 that can be elevated on respective radio tower(s) 137, access node(s) 138, and global positioning system (GPS) satellites 139. These components can also be positioned on other structures or at ground level. Some of these devices can be communicatively coupled to at least one wide area network 140. Communication subsystem 105 communicates via OTA communication channel(s) 141a with base node 136. Communication subsystem 105 communicates via wireless communication channel(s) 141b with access node 138. In one or more particular embodiments, access node 138 supports communication using one or more IEEE 802.11 wireless local area network (WLAN) protocols. Access node 138 is connected to wide area network 140, such as the Internet. In one or more particular embodiments, communication subsystem 105 communicates with one or more locally networked devices 142 via wired or wireless link 141c provided by access node 138. Communication subsystem 105 receives downlink broadcast channel(s) 141d from GPS satellites 139 to obtain geospatial location information.

In one or more embodiments, local communication system 144 includes wireless headset 145 and smart watch 146 that are coupled to communication device 100 to form a personal access network (PAN). Communication subsystem 105 communicates via low power wireless communication channel(s) 141e with headset 145. Communication subsystem 105 communicates via second low power wireless communication channel(s) 141f, such as Bluetooth, with smart watch 146. In one or more particular embodiments, communication subsystem 105 communicates with other communication device(s) 147 via wireless link 141g to form an ad hoc network.

Data storage subsystem 107 of communication device 100 includes data storage device(s) 150. Controller 101 is communicatively connected, via system interlink 151, to data storage device(s) 150. Data storage subsystem 107 provides nonvolatile storage that is accessible by controller 101. For example, data storage subsystem 107 can provide a selection of program code and applications such as housing position-based band-scan prioritizing (HPBBSP) application 154 and other application(s) 155 that can be loaded into device memory 106. In one or more embodiments, data storage device(s) 150 can include hard disk drives (HDDs), optical disk drives, and/or solid-state drives (SSDs), etc. Data storage subsystem 107 of communication device 100 can include removable storage device(s) (RSD(s)) 156, which is received in RSD interface 157. Controller 101 is communicatively connected to RSD 156, via system interlink 151 and RSD interface 157. In one or more embodiments, RSD 156 is a non-transitory computer program product or computer readable storage device. Controller 101 can access RSD 156 or data storage device(s) 150 to provision communication device 100 with program code, such as HPBBSP application 154 and other applications 155. When executed by controller 101, the program code causes or configures communication device 100 to provide the functionality described herein.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161 Controller 101 can further include distributed processing and control components that are internal to housing assembly 102 or grouped with other components, such as baseband processor 135 of communication subsystem 105. In one or embodiments that are not depicted, controller 101 can further include distributed processing and control components that are peripheral or remote to housing assembly 102. Data processor 161 is communicatively coupled, via system interlink 151, to device memory 106. In one or more embodiments, controller 101 of communication device 100 is communicatively coupled via system interlink 151 to communication subsystem 105, data storage subsystem 107, and input/output subsystem 108. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 106 includes program code and applications such as HPBBSP application 154 and other application(s) 155. Device memory 106 further includes operating system (OS) 166, firmware interface 167, such as basic input/output system (BIOS) or Uniform Extensible Firmware Interface (UEFI), and firmware 168. Device memory 106 includes data 169, such as band-scan priority lists 170 used by HPBBSP application 154. Processor subsystem 160 of controller 101 executes program code to provide operating functionality of communication device 100. The software and/or firmware modules have varying functionality when their corresponding program code is executed by processor subsystem 160 or secondary processing devices within communication device 100. Processor subsystem 160 of controller 101 can execute program code of HPBBSP application 154 to improve downlink reception in marginal coverage areas.

Recent developments and standards for communication devices include use of higher communication bands that can support higher data rates. For example, the latest cellular service standard referred to as fifth generation new radio (5G NR) uses spectrum in the existing fourth generation long term evolved (4G LTE) standard in sub-6 GHz frequency range (600 MHz to 6 GHz). For higher data rates, 5G NR also uses spectrum in millimeter wave (mmWave) bands (24-86 GHz). The mmWave band assigned to 5G NR has short wavelengths of 1-10 mm that require placement of the antenna at or near the surface of the communication device for satisfactory antenna performance. At these frequencies, the individual antennas can be small and directional. Achieving sufficient transmit power and coverage requires use of a group of antennas positioned as a sub-array or an array of mmWave antennas to operate together for antenna beam steering. Other sub-arrays or arrays of mmWave antennas are placed on more than one side of the communication device for spatial coverage. Achieving required antenna beam steering or spatial coverage in certain radio frequency (RF) bands can be compromised by antennas affected by an open position or closed position of the communication device. Generally-known communication devices do not change prioritization of scanning and acquiring cells for network service based on the open/close position of the communication device.

For clarity, terminology used for the selection and acquisition of network services is based on LTE protocols. The present disclosure implements similar procedures for other active over-the-air (OTA) cellular services such as 5G NR. After initial synchronization of the communication device, or user equipment (UE), with a network and obtaining a master information block (MIB) from a nearby evolved base node (eNodeB or eNB), the UE starts to listen to system information block type 1 (SIB-1) which is carrying cell access related information. SIB1 is transmitted through broadcast control channel (BCCH), downlink shared channel (DL-SCH), and physical downlink shared channel (PDSCH). The LTE compliant UE is responsible for selecting a Public Land Mobile Network (PLMN) for subsequent cell selection. A PLMN is identified by its PLMN identity broadcast within SIB-1. A single cell can belong to multiple PLMNs, so SIB-1 may broadcast a list of PLMN identities.

To select a PLMN, the LTE UE non-access stratum (NAS) layer requests an access stratum (AS) layer to report available PLMN(s). In response, the UE scans all radio frequency (RF) channels within its supported RF bands. The UE searches for the strongest cell carrier and reads system identifiers (Sis) to identify the PLMN. PLMNs with strength above threshold (e.g., −110 dBm) are reported as high quality. Other PLMNs are also reported to the NAS layer. UEs optimize PLMN search procedures using stored information such as RF carriers and cell parameters in a band-scan priority list. According to aspects of the present disclosure, prioritization of scanning for RF frequency bands is based at least in part on housing position of the communication device to mitigate degraded downlink reception performance in certain positions. The NAS layer can stop searching at any instant, for example after finding the home PLMN. The LTE NAS layer is responsible for selecting a PLMN from the list of reported PLMN(s) based on universal subscriber identity module (USIM) information or a similar data structure for PLMN selection. The international mobile subscriber identity (IMSI) defines the home PLMN (HPLMN). An HPLMN selector with access technology defines a priority of each radio access technology (RAT) associated with the HPLMN and prioritizes the PLMN and RAT. The prioritization is stored in band-scan priority lists 170, which are based in part on a position of housing assembly 102.

Band-scan priority lists 170 include forbidden PLMNs that reject attachment. Band-scan priority lists 170 include equivalent HPLMNs (EHPLMNs) that are equivalent to the currently serving PLMN to which the LTE UE is registering. The lists can be treated or deleted during the attach or tracking area update procedures. EHPLMNs are ordered in terms of their priority based on a selected PLMN and RAT combination preference and signal quality.

After selecting a PLMN, a UE selects a cell in the PLMN to camp on. After camping on the cell, the UE monitors system information, performs measurements on the serving cell and neighboring cells based on measurement rules, and selects a better cell to camp on based on cell re-selection criteria. The UE performs cell selection or re-selection using the selection-related or re-selection-related parameters from the system information or from the radio resource control (RRC) connection release message received from the eNodeB.

Cell searching is a procedure in which a UE achieves time and frequency synchronization with a cell, obtains the physical cell identifier (PCI), and learns the signal quality and other information about the cell based on the PCI. A UE performs cell searching on all frequencies before selecting or re-selecting to a cell. When a UE transitions from connected mode to idle mode or after the UE has selected a PLMN, the UE must select a cell to camp on. When the UE transitions from connected mode to idle mode, the UE first attempts to select the most recent cell the UE has camped on in connected mode, or the UE selects a suitable cell on a frequency that is allocated through the RRC connection release message. If such a cell is not available, the UE attempts to find a suitable cell by performing the stored information cell selection procedure. If the UE fails to find a suitable cell, the UE performs the initial cell selection procedure. The stored information cell selection procedure requires stored information related to carrier frequencies and cell parameters. The information is retrieved from previous measurement control information elements or from pre-existing SI messages. This information can help speed up cell selection.

Figure 2A:
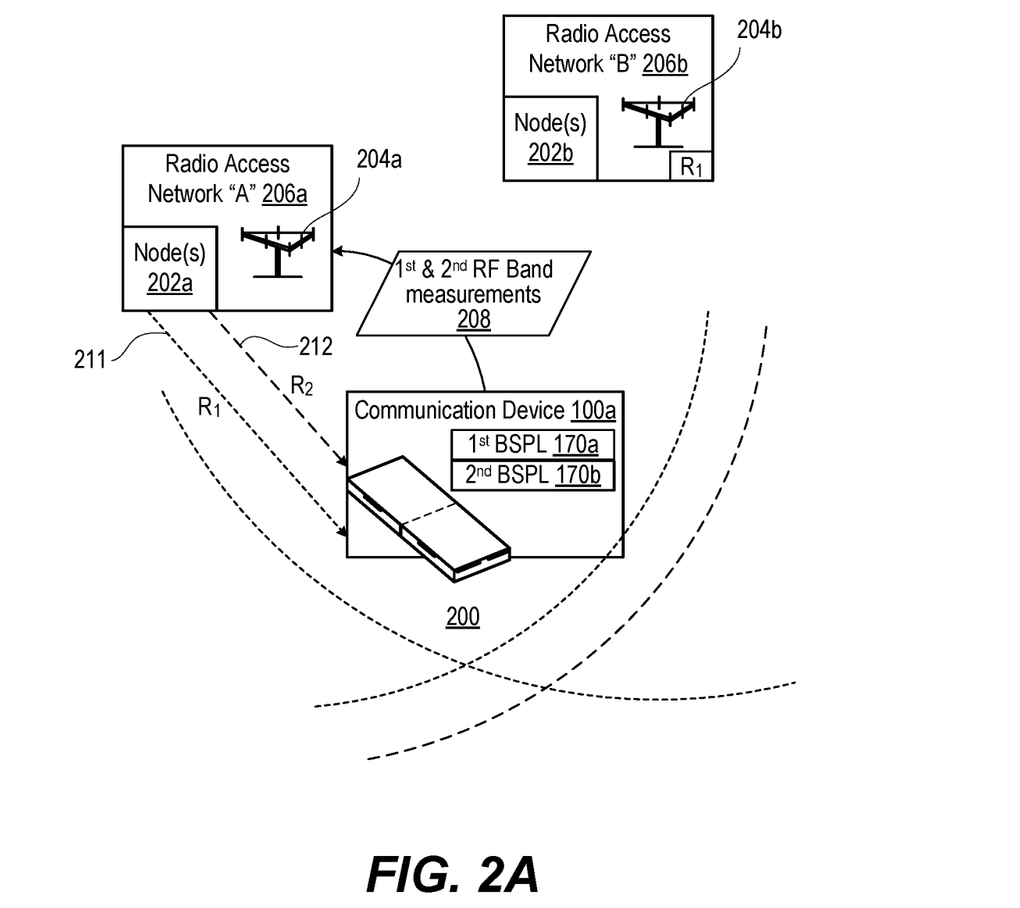
FIG. 2A depicts a top view of an example communication device with flip form factor and in an unfolded position in a downlink marginal coverage area of two nodes, according to one or more embodiments.

FIG. 2A depicts a top view of example communication device 100a having a flip form factor in an unfolded position. Communication device 100a operates in a downlink marginal coverage area 200 of one or more nodes 202a supported by cell tower 204a of radio access network (RAN) "A" 206a. RAN "A" 206a provides downlinks 211-212 that are respectively in first and second RF bands ($R_1$, $R_2$). When communication device 100a is in a second position (e.g., unfolded), the performance of communication device 100a is not degraded for the first RF band and is within a coverage area of both downlinks 211-212. The coverage area is a combination of transmission performance of RAN "A" 206a and reception performance of communication device 100a. Communication device 100a is camped on the one or more nodes 202a for service. Communication device 100a periodically measures reception from surrounding cells, including neighboring node(s) 202b supported by cell tower 204b of RAN "B" 206b. While in the second position, communication device 100a reports first and second RF band measurements 208 to node(s) 202a. Also, in the second position (e.g., unfolded), communication device 100a uses second band-scan priority list 170b for scanning and acquiring cells including the one or more nodes 202b of neighboring RAN "B" 206b that use the first RF band.

Figure 2B:
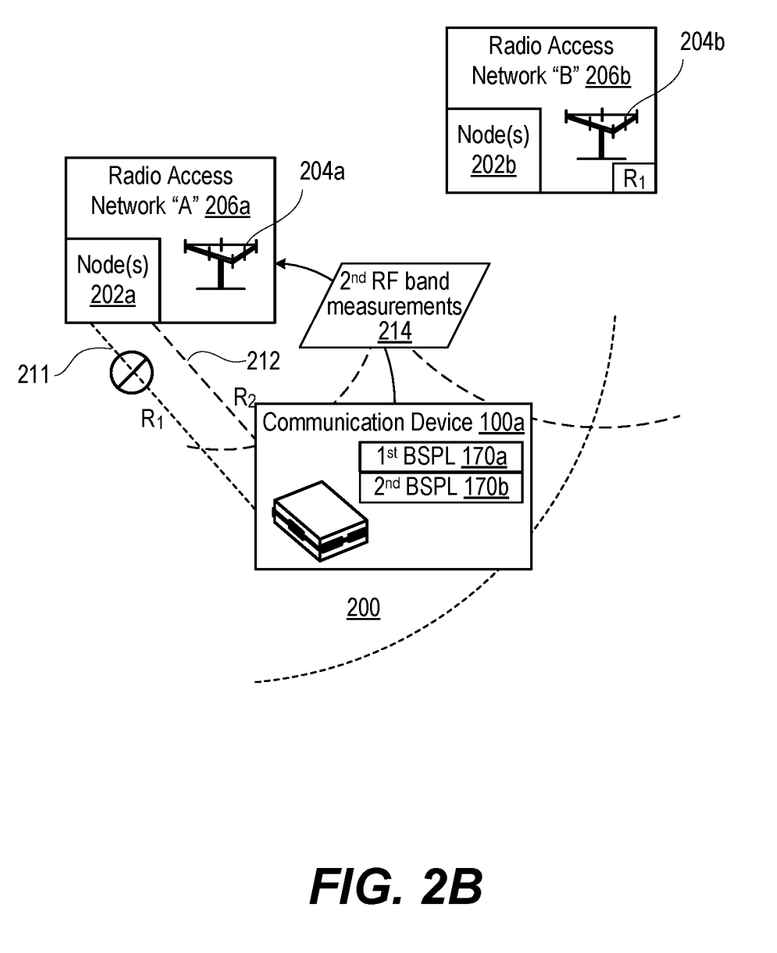
FIG. 2B depicts a top view of the example communication device in a folded position in the downlink marginal coverage area of the two nodes of FIG. 2A, according to one or more embodiments.

FIG. 2B depicts a top view of example communication device 100a in a folded position and located at the same location in FIG. 2A. When communication device 100a is in the first position (e.g., folded), performance is degraded for the first RF band, which reduces the coverage area of the RF band downlink 211. Communication device 100a is not within a coverage area of first RF band downlink 211 from the one or more nodes 202a. Communication device 100a is not within a first RF band coverage area of the one or more nodes 202b. Communication device 100a remains within second RF band coverage area of the one or more nodes 202a. In the first position, communication device 100a reports only second RF band measurements 208 to node(s) 202a. In the second position, communication device 100a uses second band-scan priority list 170b for scanning and acquiring cells including the one or more nodes 202b of neighboring RAN "B" 206b after moving into the coverage area of nodes 202b.

Figure 3A:
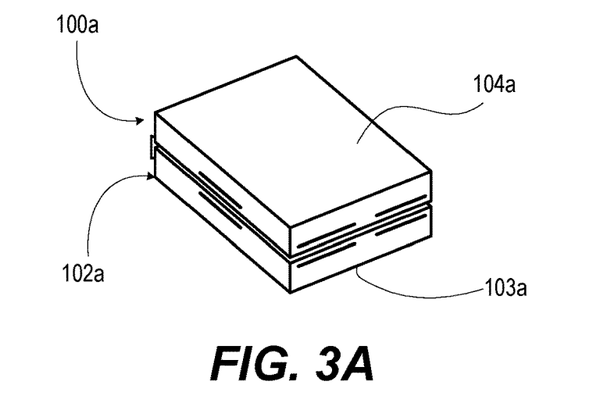
FIG. 3A depicts a three-dimensional view of the example communication device of FIG. 2A in a first folded position, according to one or more embodiments.
Figure 3B:
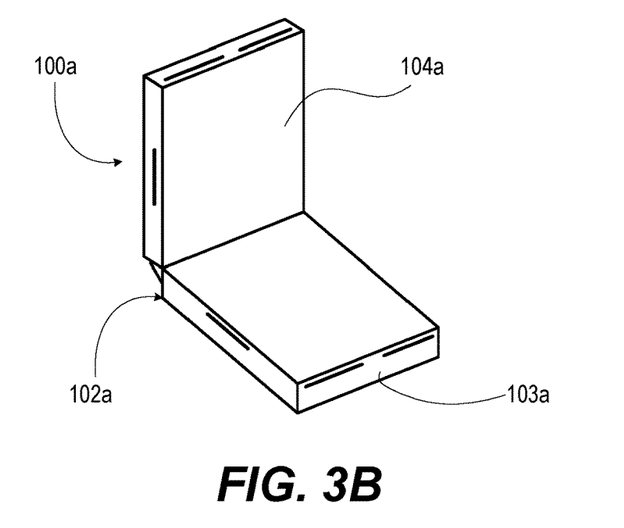
FIG. 3B depicts a three-dimensional view of the example communication device of FIG. 3A in an intervening partially open/unfolded position, according to one or more embodiments.
Figure 3C:
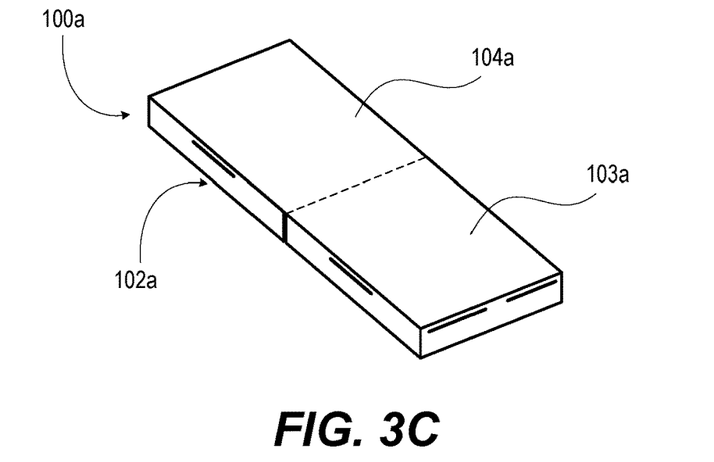
FIG. 3C depicts a three-dimensional view of the example communication device of FIG. 3A in a second open/unfolded position, according to one or more embodiments.

FIG. 3A depicts a three-dimensional view of example communication device 100a where first housing 103a is a base housing and second housing 104a is a flip housing. In one or more embodiments, communication device 100a has identical or similar components as described for communication device 100 (FIG. 1). In FIG. 3A, communication device 100a is in a folded position. FIG. 3B depicts a three-dimensional view of example communication device 100a in an intervening partially open/unfolded position. FIG. 3C depicts a three-dimensional view of example communication device 100a in an open/unfolded position. In one or more embodiments, the first position that has degraded performance in the first RF band can be one or two of the depicted positions, and the second position that does not have degraded performance in the first RF band is the remaining one or two positions, such as open position in FIG. 3C. In one or more embodiments, example communication device 100a is capable of remaining in one or more intermediate positions. For example, communication device 100a can remain half open (FIG. 3B). Certain portions of the intervening positions between open and closed can have varying degrees of degraded antenna performance. Portions of the intervening positions that are sufficiently degraded can be treated as being in the first position for purposes of prioritizing cell scanning and acquisition. In one or more embodiments, communication device 100a can have more than two band-scan priority lists to provide more granularity in the amount of degradation of downlink antenna performance. For example, the half-open position can be a frequently used position and have a particular antenna performance that is distinct from both the fully open and the fully closed positions. Communication device 100a can mitigate more than two degraded positions of housing assembly 102a.

Figure 4A:
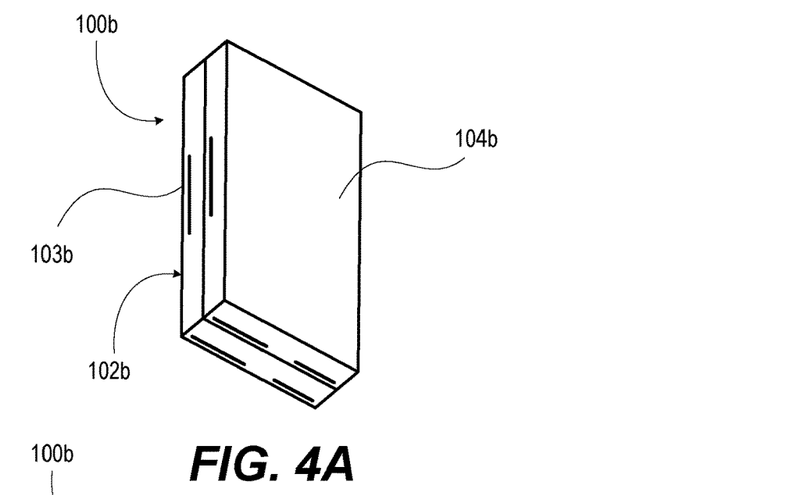
FIG. 4A depicts a three-dimensional view of an example communication device and an augmenting modular device in a first engaged position, according to one or more embodiments.
Figures 4B, 4C:
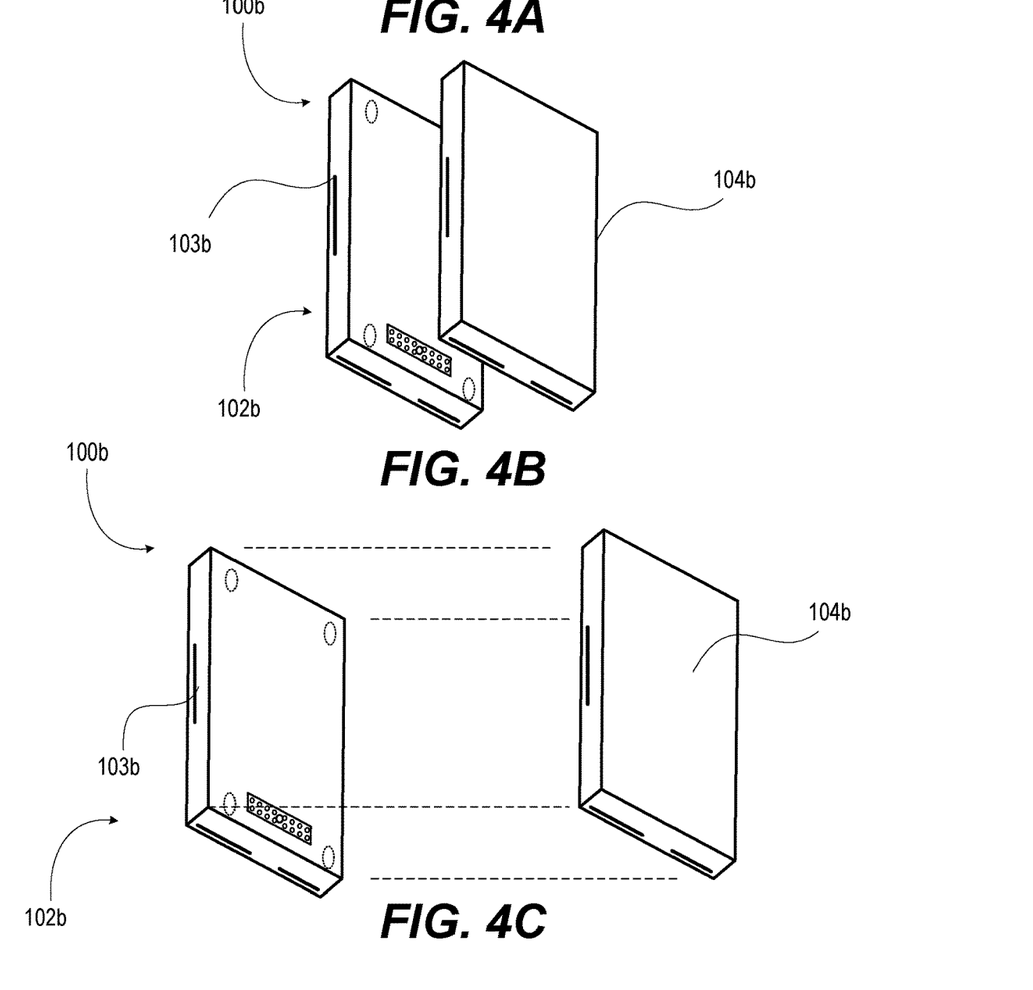
FIG. 4B depicts a three-dimensional view of the example communication device of FIG. 4A in an intervening disengaged position, according to one or more embodiments.
FIG. 4C depicts a three-dimensional view of the example communication device of FIG. 4A in a second disengaged and separated position, according to one or more embodiments.

FIG. 4A depicts a three-dimensional view of example communication device 100b having first housing 103b that is augmented by second housing 104b to form an assembled and engaged position. In one or more embodiments, communication device 100b has identical or similar components described for communication device 100 (FIG. 1). Second housing 104b can be a module that adds functionality of a high performance camera, audio speaker, 5G NR transceiver, or other modules ("mods"). In one or more embodiments, first and second housings 103b, 104b are magnetically engaged. FIG. 4B depicts a three-dimensional view of example communication device 100b with housing assembly 102 in an intervening disengaged (disassembled) position. FIG. 4C depicts a three-dimensional view of example communication device 100b in a second disengaged and separated position. Depending on various configurations of housing assembly 102b and functional components, degraded downlink reception performance of communication device 100b can occur in one of the engaged position (FIG. 4A) or the disengaged position (FIG. 4C). In one or more embodiments, the engaged position of FIG. 4A can affect antenna performance due to proximity of first and second housings 103b, 104b. Thus, communication device 100b in FIG. 4A is in the first position that is associated with degraded downlink reception performance and in FIGS. 4B-4C is in the second position that is associated with downlink reception performance that is not degraded. Degradation of downlink reception performance can be the converse in other implementations. In one or more embodiments, the second housing 104b provides a separate transceiver that enhances performance in the first RF band. The communication device 100b is limited to the capabilities of the first housing 103b when second housing 104b is separated from first housing 103b. Thus, communication device 100b in FIG. 4A is in the second position that is associated with downlink reception performance that is not degraded and in FIGS. 4B-4C is identified as being in the first position based on degradation of downlink antenna performance.

Figure 5A:
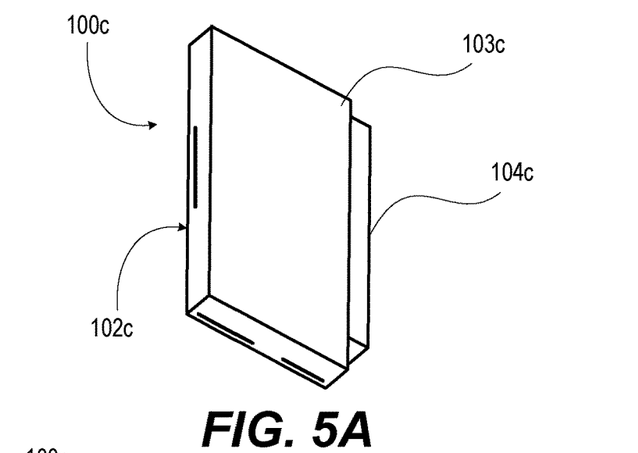
FIG. 5A depicts a three-dimensional view of an example communication device having a slide tray in a first retracted position, according to one or more embodiments.
Figure 5B:
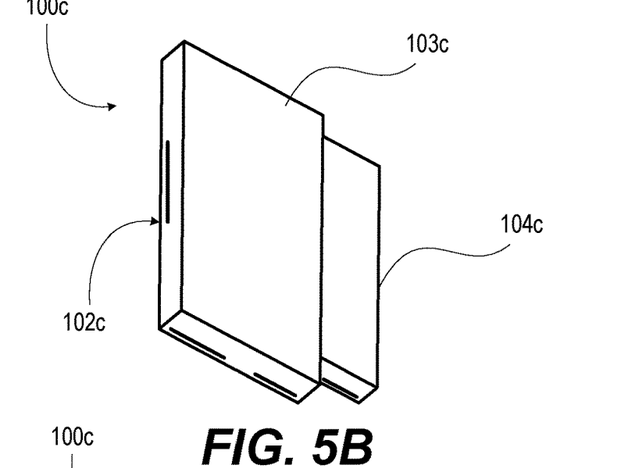
FIG. 5B depicts a three-dimensional view of the example communication device of FIG. 5A with the slide tray in an intervening, partially extended position, according to one or more embodiments.
Figure 5C:
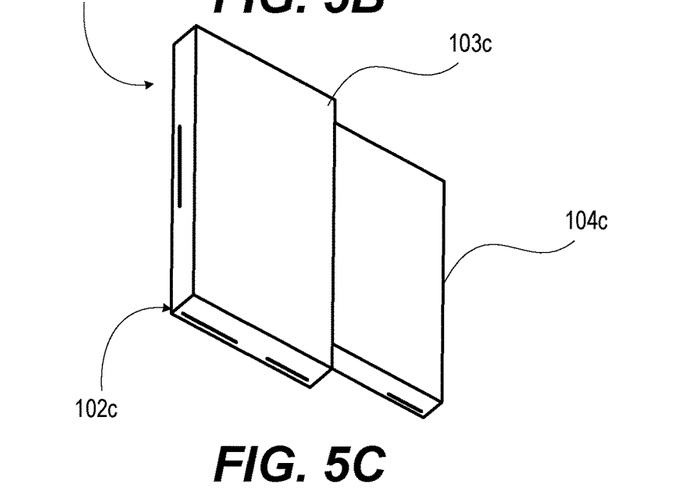
FIG. 5C depicts a three-dimensional view of the example communication device of FIG. 5A with the slide tray in a second fully extended position, according to one or more embodiments.

FIG. 5A depicts a three-dimensional view of example communication device 100c with housing assembly 102c having first housing 103c that is a base housing and having second housing 104c. In one or more embodiments, communication device 100c has identical or similar components described for communication device 100 (FIG. 1). Second housing 104c is a slide tray in a retracted position. FIG. 5B depicts a three-dimensional view of example communication device 100c with the second housing 104c in an intervening partially extended position. FIG. 5C depicts a three-dimensional view of example communication device 100c with second housing 104c in a fully extended position. Depending on antenna placement and other factors, communication device 100c has a degraded downlink performance, corresponding to the first position, in one or two of the positions: (i) retracted position (FIG. 5A); (ii) intervening partially extended position (FIG. 5B); and (iii) fully extended position (FIG. 5C). In the remaining one or two positions, communication device 100c does not have a degraded performance, corresponding to the second position.

Figure 6A:
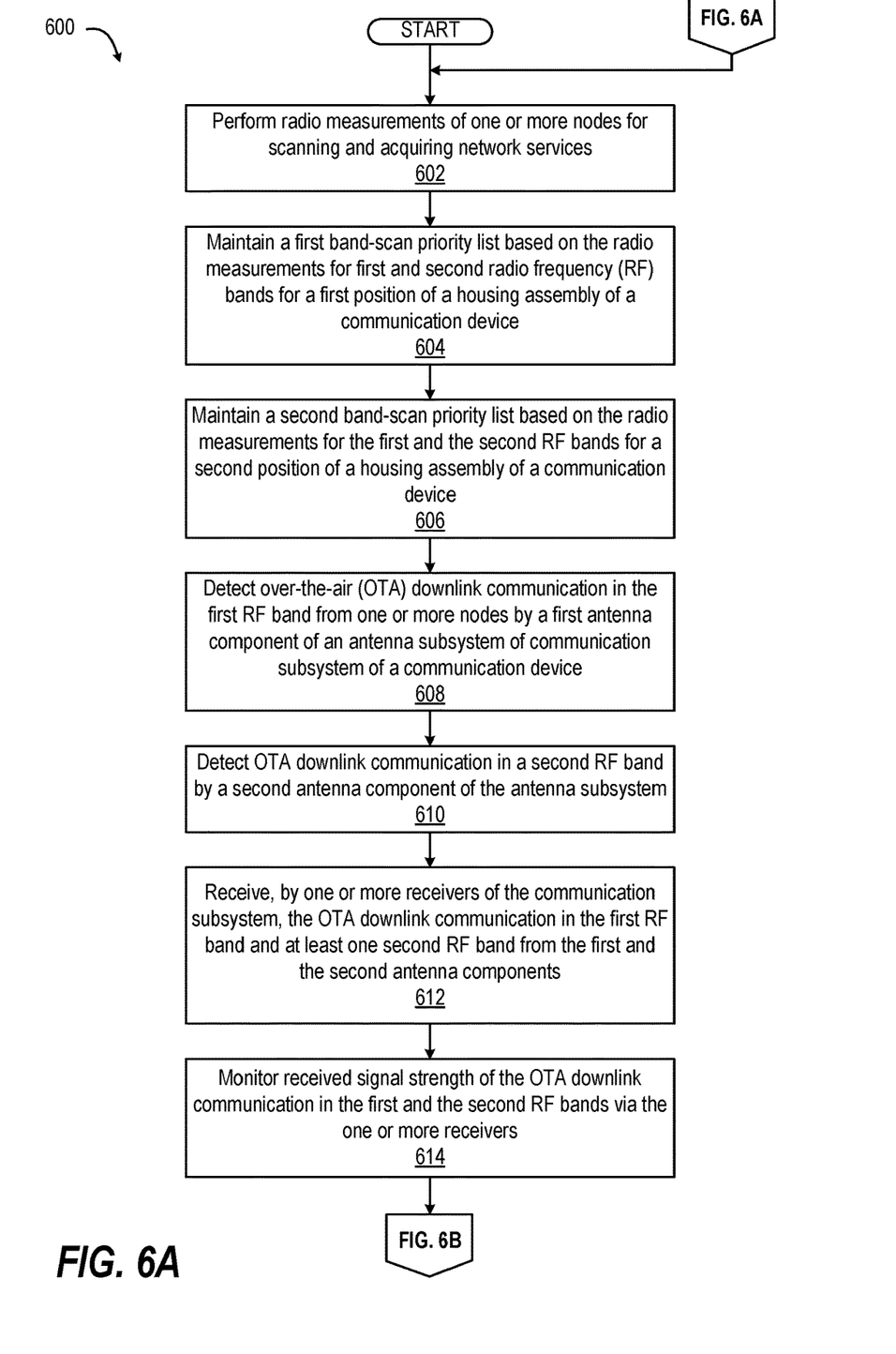
FIGS. 6A-6B (FIG. 6) present a flow diagram of a method, by a communication device having positionable housings, for mitigating degraded antenna downlink performance in a marginal coverage area, according to one or more embodiments.
Figure 6B:
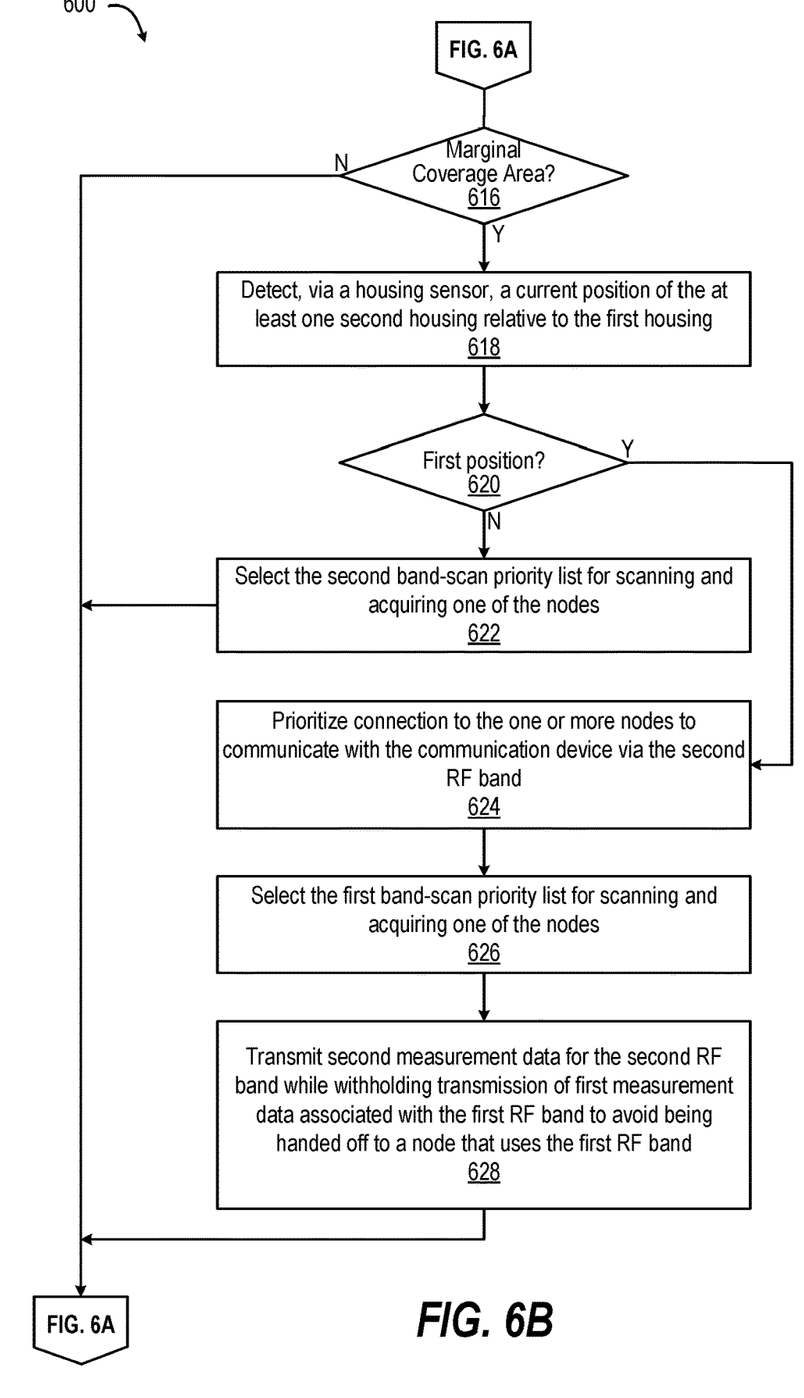

FIGS. 6A-6B (FIG. 6) present a flow diagram of method 600 for mitigating degraded antenna downlink performance in a marginal coverage area by a communication device having positionable housings. The description of method 600 is provided with general reference to the specific components illustrated within the preceding FIGS. 1, 2A-2B, 3A-3C, 4A-4C, and 5A-5C. In at least one embodiment, communication device 100, managed by controller 101 (FIGS. 1, 2A-2B, 3A-3C, 4A-4C, and 5A-5C) performs method 600 using communication subsystem 105 (FIG. 1), managed by controller 101 (FIG. 1). In one or more embodiments, baseband processor 135 of communication subsystem 105, as part of controller 101, performs at least some of the functionality of method 600. In one or more embodiments, processor subsystem 160, as part of controller 101, executes HPBBSP application 154 to configure communication subsystem 105 to perform at least some of the functionality of method 600. Specific components described in method 600 can be identical or similar to specific components of the same name used to describe preceding FIGS. 1, 2A-2B, 3A-3C, 4A-4C, and 5A-5C. With reference to FIG. 6A, method 600 includes performing radio measurements of one or more nodes. The measurements are used for scanning and acquiring network services (block 602). Method 600 includes maintaining a first band-scan priority list based on the radio measurements for first and second radio frequency (RF) bands while a housing assembly of the communication device is in a first position (block 604). The communication device includes a first housing and at least one second housing. The at least one second housing is movable relative to the first housing between a first position and a second position, which can include moving through intervening positions. The first antenna component of the antenna subsystem is attached to the first housing. The second antenna component of the antenna subsystem is attached to the at least one second housing. The communication subsystem has a degraded reception performance in the first RF band while the at least one second housing is in the first position. Method 600 includes maintaining a second band-scan priority list based on the radio measurements for the first and the second RF bands while the housing assembly of the communication device is in the second position (block 606). Method 600 includes detecting over-the-air (OTA) downlink communication in the first RF band from one or more nodes by a first antenna component of an antenna subsystem of the communication device (block 608). Method 600 includes detecting OTA downlink communication in a second RF band by a second antenna component of the antenna subsystem (block 610). Method 600 includes receiving, by one or more receivers of the communication subsystem, the OTA downlink communication in the first RF band and at least one second RF band from the first and the second antenna components (block 612). Method 600 includes monitoring received signal strength of the OTA downlink communication in the first and the second RF bands via the one or more receivers (block 614).

With reference to FIG. 6B, method 600 includes determining based on the received signal strength, in decision block 616, whether the communication device is in a marginal coverage area for receiving the first RF band from the one or more nodes. In response to determining that the communication device is not in a marginal coverage area, method 600 returns to block 602 (FIG. 6A). In response to determining that the communication device is in a marginal coverage area, method 600 includes detecting, via a housing sensor, a current position of the at least one second housing relative to the first housing (block 618). Method 600 includes determining, in decision block 620, whether the current position is the first position. In response to detecting that the at least one second housing is not in the first position, method 600 includes selecting the second band-scan priority list for scanning and acquiring one of the nodes (block 622). Then method 600 returns to block 602 (FIG. 6A). In response to detecting that the at least one second housing is in the first position, method 600 includes prioritizing connection to the one or more nodes to communicate with the communication device via the second RF band (block 624). In one or more embodiments, method 600 includes selecting the first band-scan priority list for scanning and acquiring one of the nodes (block 626). In one or more embodiments, method 600 includes transmitting second measurement data for the second RF band while withholding transmission of first measurement data associated with the first RF band to avoid the communication device being handed off by a serving node to a node that uses the first RF band (block 628). Then method 600 returns to block 602 (FIG. 6A).

In one or more embodiments, method 600 includes detecting a change from the first position to the second position and waiting for a first period of time before reprioritizing connection to the one or more nodes in response to detecting the change from the first position to the second position. Method 600 also includes detecting a change from the second position to the first position and waiting for a second period of time before reprioritizing connection to the one or more nodes in response to detecting a change from the second position to the first position. The first and second periods of time provide hysteresis that avoids abrupt mode changes for instances in which the housing is only momentarily changed in position before returning again to the prior position. In one or more embodiments, the first period of time is longer than the second period of time. Moving to the first position with degraded performance warrants a more aggressive need for reprioritizing behavior.

In one or more embodiments, method 600 includes determining that the current position of the at least one second housing is in at least one intermediate position. The at least one second housing is movable relative to the first housing between the first position and the second position via at least one intermediate position. The communication subsystem can have a degraded reception performance in the first RF band in the at least one intermediate position of the at least one second housing as compared to the second position. Method 600 includes prioritizing connection to the one or more nodes to communicate with the communication device via the second RF band and not the first RF band in response to being in the at least one intermediate position.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a first housing;
at least one second housing that is movable relative to the first housing between a first position and a second position;
a housing sensor that detects a current position of the at least one second housing relative to the first housing;
a communication subsystem comprising:
one or more receivers that support over-the-air (OTA) downlink communication in a first radio frequency (RF) band and at least one second RF band from one or more nodes; and
an antenna subsystem having more than one antenna component comprising a first antenna component attached to the first housing and a second antenna component attached to the at least one second housing, the communication subsystem having a degraded reception performance in the first RF band while the at least one second housing is in the first position;
a memory containing a band-scan priority list of RF bands that is based at least in part on the relative position of the first and the at least one second housing; and
a controller communicatively coupled to the housing sensor, the communication subsystem, and the memory, and which:
determines that the communication device is in a marginal coverage area for receiving the first RF band from the one or more nodes;
determines, based on the housing sensor, that the at least one second housing is in the first position; and
in response to the at least one second housing being in the first position while the communication device is in the marginal coverage area for receiving the first RF band, prioritizes connection to the one or more nodes to communicate with the communication device via a second RF band from among the at least one second RF band based on the band-scan priority list.

2. The communication device of claim 1, wherein the at least one second housing comprises a selected one of: (i) a flip housing that is pivotally connected to the first housing; (ii) a slide tray slidably connected to the first housing; and (iii) a modular housing releasably engaged to the first housing.

3. The communication device 1, wherein the controller prioritizes connection to the one or more nodes to communicate with the communication device via the second RF band and not the first RF band by withholding transmission of first measurement data for the first RF band and transmitting second measurement data for the second RF band.

4. The communication device of claim 1, wherein the controller:
waits for a first period of time before reprioritizing connection to the one or more nodes in response to detecting a change of the at least one second housing from the first position to the second position; and
waits for a second period of time before reprioritizing connection to the one or more nodes in response to detecting a change of the at least one second housing from the second position to the first position.

5. The communication device of claim 1, wherein:
the at least one second housing is movable into at least one intermediate position between the first position and the second position;
the communication subsystem has a degraded reception performance in the first RF band while the at least one second housing is in the at least one intermediate position; and
the controller, in response to determining, based on the housing sensor, that the at least one second housing is in the at least one intermediate position, prioritizes connection to the one or more nodes to communicate with the communication device via the second RF band and not the first RF band.

6. The communication device of claim 1, wherein, to prioritize connection to the one or more nodes to communicate with the communication device via the second RF band and not the first RF band, the controller:
- identifies that the communication subsystem is connected to a serving cell of the one or more nodes;
- identifies that a neighbor cell of the one or more nodes communicates via the first RF band; and
- withholds measurement data for the neighbor cell to avoid a handoff to the neighbor cell.

7. The communication device of claim 1, wherein the controller:
- in response to determining that the communication device is not connected to the one or more nodes:
  - identifies, based on the housing sensor, a current position of the at least one second housing;
  - identifies a particular node of the one or more nodes that has priority based on the current position;
  - scans for the particular node; and
  - requests service from the particular node.

8. A method comprising:
- receiving, by one or more receivers of a communication subsystem of a communication device, over-the-air (OTA) downlink communication in a first radio frequency (RF) band and at least one second RF band from one or more nodes, the OTA downlink communication being detected by an antenna subsystem of the communication device having more than one antenna component, the communication device having a first housing and at least one second housing, the at least one second housing being movable relative to the first housing between a first position and a second position, a first antenna component of the antenna subsystem attached to the first housing and a second antenna component of the antenna subsystem attached to the at least one second housing;
- identifying that the communication device is in a marginal coverage for receiving the first RF band from the one or more nodes;
- detecting, via a housing sensor, a current position of the at least one second housing relative to the first housing, the communication subsystem having a degraded reception performance in the first RF band while the at least one second housing is in the first position; and
- in response to detecting that the at least one second housing is in the first position, prioritizing connection to the one or more nodes to communicate with the communication device via the second RF band.

9. The method of claim 8, wherein the at least one second housing comprises a selected one of: (i) a flip housing that is pivotally connected to the first housing; (ii) a slide tray slidably connected to the first housing; and (iii) a modular housing releasably engaged to the first housing.

10. The method of claim 8, wherein prioritizing connection to the one or more nodes to communicate with the communication device via the second RF band comprises:
- withholding transmission of first measurement data associated with the first RF band; and
- transmitting second measurement data for the second RF band.

11. The method of claim 8, further comprising:
- waiting for a first period of time before reprioritizing connection to the one or more nodes in response to detecting a change of the at least one second housing from the first position to the second position; and
- waiting for a second period of time before reprioritizing connection to the one or more nodes in response to detecting a change of the at least one second housing from the second position to the first position.

12. The method of claim 8, wherein:
- determining that the current position of the at least one second housing is in at least one intermediate position, the at least one second housing movable relative to the first housing between the first position and the second position via at least one intermediate position, the communication subsystem having a degraded reception performance in the first RF band in the at least one intermediate position of the of the at least one second housing as compared to the second position; and
- prioritizing connection to the one or more nodes to communicate with the communication device via the second RF band and not the first RF band.

13. The method of claim 8, wherein prioritizing connection to the one or more nodes to communicate with the communication device via the second RF band and not the first RF band comprises:
- identifying that the communication subsystem is connected to a serving cell of the one or more nodes;
- identifying that a neighbor cell of the one or more nodes communicates via the first RF band; and
- withholding measurement data for the neighbor cell to avoid a handoff to the neighbor cell.

14. The method of claim 8, further comprising:
- in response to determining that the communication device is not connected to the one or more nodes:
  - identifying, based on the housing sensor, a current position of the at least one second housing;
  - identifying a particular node of the one or more nodes that has priority based on the current position;
  - scanning for the particular node; and
  - requesting service from the particular node.

15. A computer program product comprising:
- a non-transitory computer readable storage device; and
- program code on the computer readable storage device that when executed by a processor associated with a communication device, the program code enables the communication device to provide the functionality of:
  - receiving, by one or more receivers of a communication subsystem of a communication device, over-the-air (OTA) downlink communication in a first radio frequency (RF) band and at least one second RF band from one or more nodes, the OTA downlink communication being detected by an antenna subsystem of the communication device having more than one antenna component, the communication device having a first housing and at least one second housing, the at least one second housing being movable relative to the first housing between a first position and a second position, a first antenna component of the antenna subsystem attached to the first housing and a second antenna component of the antenna subsystem attached to the at least one second housing;
  - identifying that the communication device is in a marginal coverage for receiving the first RF band from the one or more nodes;
  - detecting, via a housing sensor, a current position of the at least one second housing relative to the first housing, the communication subsystem having a degraded reception performance in the first RF band while the at least one second housing is in the first position; and
  - in response to detecting that the at least one second housing is in the first position, prioritizes connection to the one or more nodes to communicate with the communication device via the second RF band.

16. The computer program product of claim 15, wherein the at least one second housing comprises a selected one of: (i) a flip housing that is pivotally connected to the first housing; (ii) a slide tray slidably connected to the first housing; and (iii) a modular housing releasably engaged to the first housing.

17. The computer program product of claim 15, wherein the program code enables the communication device to provide the functionality of prioritizing connection to the one or more nodes to communicate with the communication device via the second RF band and not the first RF band by:
waiting first measurement data for the first RF band; and
transmitting second measurement data for the second RF band.

18. The computer program product of claim 15, wherein the program code enables the communication device to provide the functionality of:
waiting for a first period of time before reprioritizing connection to the one or more nodes in response to detecting a change of the at least one second housing from the first position to the second position; and
waiting for a second period of time before reprioritizing connection to the one or more nodes in response to detecting a change of the at least one second housing from the second position to the first position.

19. The computer program product of claim 15, wherein the program code enables the communication device to provide the functionality of:
determining that the current position of the at least one second housing is in at least one intermediate position, the at least one second housing movable relative to the first housing between the first position and the second position via at least one intermediate position, the communication subsystem having a degraded reception performance in the first RF band in the at least one intermediate position of the of the at least one second housing as compared to the second position; and
prioritizing connection to the one or more nodes to communicate with the communication device via the second RF band and not the first RF band.

20. The computer program product of claim 15, wherein the program code enables the communication device to provide the functionality of prioritizing connection to the one or more nodes to communicate with the communication device via the second RF band and not the first RF band by:
identifying that the communication subsystem is connected to a serving cell of the one or more nodes;
identifying that a neighbor cell of the one or more nodes communicates via the first RF band; and
withholding measurement data for the neighbor cell to avoid a handoff to the neighbor cell.

* * * * *